(12) United States Patent
Pettit et al.

(10) Patent No.: US 9,253,536 B2
(45) Date of Patent: Feb. 2, 2016

(54) UPDATING DATA-CONSUMING ENTITIES

(75) Inventors: Bradley R. Pettit, Los Gatos, CA (US); Nicolae Surpatanu, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 12/406,816

(22) Filed: Mar. 18, 2009

(65) Prior Publication Data

US 2010/0241669 A1 Sep. 23, 2010

(51) Int. Cl.

| | | |
|---|---|---|
| G06F 17/30 | (2006.01) | |
| H04N 21/443 | (2011.01) | |
| H04N 21/262 | (2011.01) | |
| H04N 21/431 | (2011.01) | |
| H04N 21/47 | (2011.01) | |
| H04N 21/6547 | (2011.01) | |
| H04N 21/81 | (2011.01) | |

(52) U.S. Cl.
CPC ...... *H04N 21/4438* (2013.01); *G06F 17/30781* (2013.01); *H04N 21/26291* (2013.01); *H04N 21/431* (2013.01); *H04N 21/47* (2013.01); *H04N 21/6547* (2013.01); *H04N 21/8173* (2013.01)

(58) Field of Classification Search
CPC .................. G06F 17/30879; G06F 17/30725; G06F 17/30781
USPC .......................................... 707/782, 999.201
See application file for complete search history.

(56) References Cited

U.S. PATENT DOCUMENTS

| | | | |
|---|---|---|---|
| 5,787,470 A * | 7/1998 | DeSimone et al. ........... 711/124 |
| 5,978,842 A * | 11/1999 | Noble et al. .................. 709/218 |
| 5,999,978 A | 12/1999 | Angal et al. |
| 6,112,231 A * | 8/2000 | DeSimone et al. ........... 709/213 |
| 6,138,141 A * | 10/2000 | DeSimone et al. ........... 709/203 |
| 6,226,692 B1 | 5/2001 | Miloushev |
| 6,262,729 B1 * | 7/2001 | Marcos et al. ................ 715/744 |
| 6,438,618 B1 | 8/2002 | Lortz |
| 6,446,136 B1 | 9/2002 | Pohlmann et al. |
| 6,505,241 B2 * | 1/2003 | Pitts .............................. 709/218 |
| 6,574,630 B1 | 6/2003 | Augustine et al. |
| 6,651,217 B1 | 11/2003 | Kennedy et al. |
| 6,704,804 B1 * | 3/2004 | Wilson .................... G06F 9/465 719/315 |
| 6,751,665 B2 * | 6/2004 | Philbrick et al. ............. 709/224 |
| 6,832,355 B1 | 12/2004 | Duperrouzel et al. |
| 7,216,292 B1 | 5/2007 | Snapper et al. |
| 7,249,100 B2 * | 7/2007 | Murto ................. G06F 17/3087 705/50 |
| 7,398,473 B2 | 7/2008 | Stoner |
| 7,424,717 B2 | 9/2008 | Blevins |

(Continued)

FOREIGN PATENT DOCUMENTS

| | | |
|---|---|---|
| WO | WO-2004027606 | 4/2004 |
| WO | WO-2005093603 | 10/2005 |

OTHER PUBLICATIONS

Barton et al., "Sensor-enhanced Mobile Web Clients: an XForms Approach". May 2003, ACM.*

(Continued)

*Primary Examiner* — Christyann Pulliam
*Assistant Examiner* — Sheryl Holland
(74) *Attorney, Agent, or Firm* — Aaron Chatterjee; Kate Drakos; Micky Minhas

(57) ABSTRACT

This document describes tools capable of updating data-consuming entities. These tools allow a developer of an application to use data binding to update data-consuming entities without the need to write custom code.

19 Claims, 6 Drawing Sheets

(56) References Cited

U.S. PATENT DOCUMENTS

| | | | |
|---|---|---|---|
| 7,437,376 B2 | 10/2008 | Sikchi | |
| 7,441,253 B2 | 10/2008 | Atkinson et al. | |
| 7,460,443 B2 | 12/2008 | Elners | |
| 7,475,384 B2 | 1/2009 | Heath et al. | |
| 7,483,870 B1 | 1/2009 | Mathew et al. | |
| 7,765,523 B2* | 7/2010 | Kooy | 717/106 |
| 7,899,370 B2 | 3/2011 | Nakajima | |
| 8,131,676 B2 | 3/2012 | Pettit | |
| 8,132,181 B2 | 3/2012 | Lenharth et al. | |
| 8,176,160 B2 | 5/2012 | Appleton et al. | |
| 8,239,445 B1* | 8/2012 | Gage | H04L 29/06 709/203 |
| 8,239,880 B1 | 8/2012 | Caccavale et al. | |
| 8,392,840 B2 | 3/2013 | Sharma | |
| 8,621,376 B2* | 12/2013 | Kim et al. | 715/771 |
| 9,135,091 B2 | 9/2015 | Schuler et al. | |
| 2002/0010798 A1* | 1/2002 | Ben-Shaul | G06F 17/3089 709/247 |
| 2002/0100017 A1* | 7/2002 | Grier | G06F 8/54 717/120 |
| 2002/0118300 A1 | 8/2002 | Middleton | |
| 2002/0156556 A1* | 10/2002 | Ruffner | 701/23 |
| 2002/0156840 A1* | 10/2002 | Ulrich et al. | 709/203 |
| 2002/0196279 A1* | 12/2002 | Bloomfield et al. | 345/749 |
| 2003/0188017 A1* | 10/2003 | Nomura | 709/241 |
| 2004/0057348 A1 | 3/2004 | Shteyn | |
| 2004/0107266 A1* | 6/2004 | Tanaka et al. | 709/217 |
| 2004/0137888 A1* | 7/2004 | Ohki | H04L 12/24 455/417 |
| 2004/0218894 A1 | 11/2004 | Harville et al. | |
| 2004/0230967 A1* | 11/2004 | Yuknewicz | G06F 8/71 717/170 |
| 2005/0038791 A1 | 2/2005 | Ven | |
| 2005/0055458 A1* | 3/2005 | Mohan et al. | 709/238 |
| 2005/0114757 A1 | 5/2005 | Sahota | |
| 2005/0172000 A1* | 8/2005 | Nakamura et al. | 709/203 |
| 2005/0172309 A1 | 8/2005 | Risan et al. | |
| 2005/0188350 A1* | 8/2005 | Bent et al. | 717/106 |
| 2005/0204148 A1* | 9/2005 | Mayo | H04L 63/0815 713/185 |
| 2005/0226406 A1* | 10/2005 | Forin | G06F 9/44521 380/1 |
| 2005/0273779 A1* | 12/2005 | Cheng et al. | 717/168 |
| 2005/0278737 A1 | 12/2005 | Ma | |
| 2006/0021057 A1 | 1/2006 | Risan et al. | |
| 2006/0047662 A1* | 3/2006 | Barik et al. | 707/10 |
| 2006/0070083 A1 | 3/2006 | Brunswig | |
| 2006/0074981 A1 | 4/2006 | Mauceri et al. | |
| 2006/0095577 A1* | 5/2006 | Childress | G06F 17/30861 709/229 |
| 2006/0143236 A1 | 6/2006 | Wu | |
| 2006/0179080 A1* | 8/2006 | Meek et al. | 707/200 |
| 2006/0196950 A1 | 9/2006 | Kiliccote | |
| 2006/0212842 A1* | 9/2006 | Gossman | G06F 8/38 717/106 |
| 2006/0224690 A1* | 10/2006 | Falkenburg et al. | 709/217 |
| 2006/0248451 A1* | 11/2006 | Szyperski | G06F 8/00 715/209 |
| 2006/0270462 A1 | 11/2006 | Chi | |
| 2007/0033652 A1* | 2/2007 | Sherwani et al. | 726/26 |
| 2007/0050320 A1* | 3/2007 | Carrier | G06F 17/30914 707/E17.124 |
| 2007/0124460 A1 | 5/2007 | McMullen | |
| 2007/0139441 A1 | 6/2007 | Lucas | |
| 2007/0143501 A1* | 6/2007 | Pasha | G06F 8/30 709/246 |
| 2007/0169103 A1* | 7/2007 | Bhatkhande | G06F 9/44536 717/170 |
| 2007/0220092 A1* | 9/2007 | Heitzeberg | H04L 12/1818 709/204 |
| 2007/0226353 A1 | 9/2007 | Ruul | |
| 2007/0255811 A1* | 11/2007 | Pettit et al. | 709/220 |
| 2008/0033806 A1 | 2/2008 | Howe | |
| 2008/0064351 A1 | 3/2008 | Landschaft | |
| 2008/0114810 A1 | 5/2008 | Malek et al. | |
| 2008/0134250 A1 | 6/2008 | Liu | |
| 2008/0140714 A1* | 6/2008 | Rhoads et al. | 707/104.1 |
| 2008/0205205 A1 | 8/2008 | Chiang | |
| 2008/0215345 A1 | 9/2008 | Hollingsworth et al. | |
| 2008/0282083 A1 | 11/2008 | Risan et al. | |
| 2008/0301803 A1 | 12/2008 | Ontaneda | |
| 2008/0313650 A1 | 12/2008 | Arnquist et al. | |
| 2008/0319856 A1 | 12/2008 | Zito | |
| 2008/0320503 A1* | 12/2008 | Kruglick | G06F 9/5055 719/332 |
| 2009/0077211 A1 | 3/2009 | Appleton et al. | |
| 2009/0138502 A1 | 5/2009 | Kalaboukis et al. | |
| 2009/0198744 A1 | 8/2009 | Nakamura | |
| 2009/0204719 A1 | 8/2009 | Simongini et al. | |
| 2009/0217146 A1 | 8/2009 | Goldfarb | |
| 2009/0265760 A1* | 10/2009 | Zhu | G06F 21/53 726/3 |
| 2009/0300656 A1* | 12/2009 | Bosworth | H04L 67/10 719/320 |
| 2009/0307212 A1 | 12/2009 | Ramot et al. | |
| 2010/0095337 A1* | 4/2010 | Dua | 725/110 |
| 2010/0153530 A1* | 6/2010 | Erickson | G06F 9/54 709/223 |
| 2010/0165877 A1 | 7/2010 | Shukla et al. | |
| 2010/0241527 A1 | 9/2010 | McKenna et al. | |
| 2010/0257216 A1 | 10/2010 | Pettit | |
| 2010/0257540 A1 | 10/2010 | Schuler | |
| 2010/0299620 A1 | 11/2010 | Sharma | |
| 2011/0099500 A1 | 4/2011 | Smith et al. | |
| 2011/0196940 A1* | 8/2011 | Martinez | H04L 29/06 709/217 |

OTHER PUBLICATIONS

P. Faltstrom, "E.164 No. and DNS", Sep. 2000, Network Working Group.*
V. Vasudevan, "A Web Services Primer", 2001, XML.com.*
"Web Services Conceptual Architecture WSCA" 1.0, 2001, IBM.*
"Best Practices for NI TestStand User Interface Development", Retrieved from: http://zone.ni.com/devzone/cda/tut/p/id/7560 on Feb. 4, 2009., (Jul. 15, 2008), 10 Pages.
"Custom Event Classes", Retrieved from: http://wiki.wxpython.org/CustomEventClasses on Feb. 4, 2009., (Mar. 11, 2008), 1 Page.
"DMP-6000 Network High Definition Digital Signage Media Player & Content Distribution Server (CDS) Software platform", Retrieved from <http://www.gctglobal.com/Products/Set_Top_Box/set_top box.html> on Jan. 29, 2009, 3 pages.
"Orban/Coding Technologies AAC/aacPlus Player Plugin™ ", Retrieved at <http://www.orban.com/plugin/Read_Me.html>, (Apr. 2008), 14 pages.
"Palm Pre", Retrieved from <<http://www.palm.com/us/products/phones/pre/>> on Apr. 24, 2009, Scroll down to Connected Calendars and Contacts and clock on "See Gallery"—Images 6,7 and 8, entitled "Contacts," "Linked Contact"and "Linked Contact", (Apr. 24, 2009), 7 pages.
"SeaChange IPTV", Retrieved from <http://www.schange.com/en-US/Docs/Public/products/IPTV_TVNav_BR_7-11-2008.pdf>, 16 pages.
"Set-Top Box Design Template", Retrieved from <http://msdn.microsoft.com/en-us/library/ms924238.aspx>, 4 pages.
Clausen, Joern "Attaching Data to Timeline Event", Retrieved from: <http://www.mail-archive.com/general@simile.mit.edu/msg00966.html> on Feb. 4, 2009., (Mar. 10, 2007), 2 Pages.
Hallberg, Aaron "Attaching Custom Data to a Build", Retrieved from: <http://blogs.msdn.com/aaronhallberg/archive/2008/05/27/attaching-custom-data-to-a-build.aspx> on Feb. 4, 2009., (May 27, 2008), 3 Pages.
Esposito, Dino , "Data Binding Between Controls in Windows Forms", retrieved at <<http://msdn.microsoft.com/en-us/magazine/cc301575.aspx, Feb. 2002, pp. 10.
"How to: Ensure Multiple Controls Bound to the Same Data Source Remain Synchronized", retrieved at <<http://msdn.microsoft.com/en-us/library/ms404299.aspx, Jan. 30, 2009, pp. 4.
"Manipulating Data through a Binding Source", retrieved at <<http://my.safaribooksonline.com/032126892X/ch04lev1sec5>>, Jan. 30, 2009, pp. 2.

(56) References Cited

OTHER PUBLICATIONS

"Final Office Action", U.S. Appl. No. 12/471,026, (Oct. 28, 2011), 22 pages.
"Notice of Allowance", U.S. Appl. No. 12/418,224, (Nov. 28, 2011), 8 pages.
"Load Content While Scrolling", posted at WebResource Depot, (Jun. 3, 2008), 3 pages.
"Non-Final Office Action", U.S. Appl. No. 12/418,224, (Jun. 9, 2011), 11 pages.
"Non-Final Office Action", U.S. Appl. No. 12/471,026, (Jun. 23, 2011), 18 pages.
Berseth, Matt "ASP.NET Ajax Auto-Complete Control", (Jan. 10, 2008), 5 pages.
Merlino, Andrew "Paging in ASP.NET", (Sep. 10, 2003), 4 pages.
"Non-Final Office Action", U.S. Appl. No. 12/418,317, Jan. 29, 2014, 10 pages.
"Final Office Action", U.S. Appl. No. 12/418,317, (Sep. 20, 2012), 9 pages.
"Notice of Allowance", U.S. Appl. No. 12/471,026, (Oct. 9, 2012), 15 pages.
"Non-Final Office Action", U.S. Appl. No. 12/418,317, (Apr. 4, 2013), 10 pages.
"Final Office Action", U.S. Appl. No. 12/418,317, Oct. 9, 2013, 9 pages.
"Non-Final Office Action", U.S. Appl. No. 12/418,317, (Mar. 15, 2012), 10 pages.
"Final Office Action", U.S. Appl. No. 12/418,317, Jun. 24, 2014, 10 pages.
"Non-Final Office Action", U.S. Appl. No. 12/418,317, Nov. 28, 2014, 10 pages.
"Notice of Allowance", U.S. Appl. No. 12/418,317, May 8, 2015, 9 pages.

* cited by examiner

UPDATING DATA-CONSUMING ENTITIES

BACKGROUND

Many conventional computer programs use data-consuming entities that access data from one or more data locations. Data binding is one common approach by which entities access this data. Data binding is achieved, in part, through custom code created for and located on the computer program having the data-consuming entities.

This custom code, however, may require updates for each computer program or other time-consuming management. For example, some custom code may rely on management by a software developer that does not have sufficient skill to easily manage the custom code, such as when the custom code is written by one developer and managed by another. Further, even the most skilled developer may inadvertently or maliciously cause problems for a provider of data. Because of this, some data providers do not want to enable developers to alter or otherwise manage the custom code.

SUMMARY

This document describes tools capable of updating data-consuming entities. These tools allow a developer of an application to use data binding to update data-consuming entities without the need to write custom code.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes tools capable of allowing a developer of an application to use data binding without the need to write custom code. The tools may be distributed in a software development kit provided to the developer. Full control of the custom code needed to do the data binding remains in the hands of the makers of the software development kit. This may provide increased reliability of developed applications and save development time and money.

In one embodiment, the tools use an external entity that manages data at data locations. This external entity is deployed on the computing device running the application but is external to the application. The tools may also contain a module to be embedded within the application. This internal module communicates with the external entity and enables a developer to declare a data path for one or more data-consuming entities relative to the internal module. The developer may then assign the internal module a data-location path, which the internal module may register with the external entity. The external entity then monitors the data-location path for appropriate data updates. When the external entity detects a change to the data it passes the data on to the internal entity. The internal entity updates the data-consuming entities with the changed data to which they are bound.

By so doing the tools not only enable a developer to update the data-consuming entities without the need to write custom data-binding code, the tools may also enable a change to the data location, such as moving the data from one server to another, to be easily handled by a simple change to the data-location path within the application.

Example Environment

Figure 1:
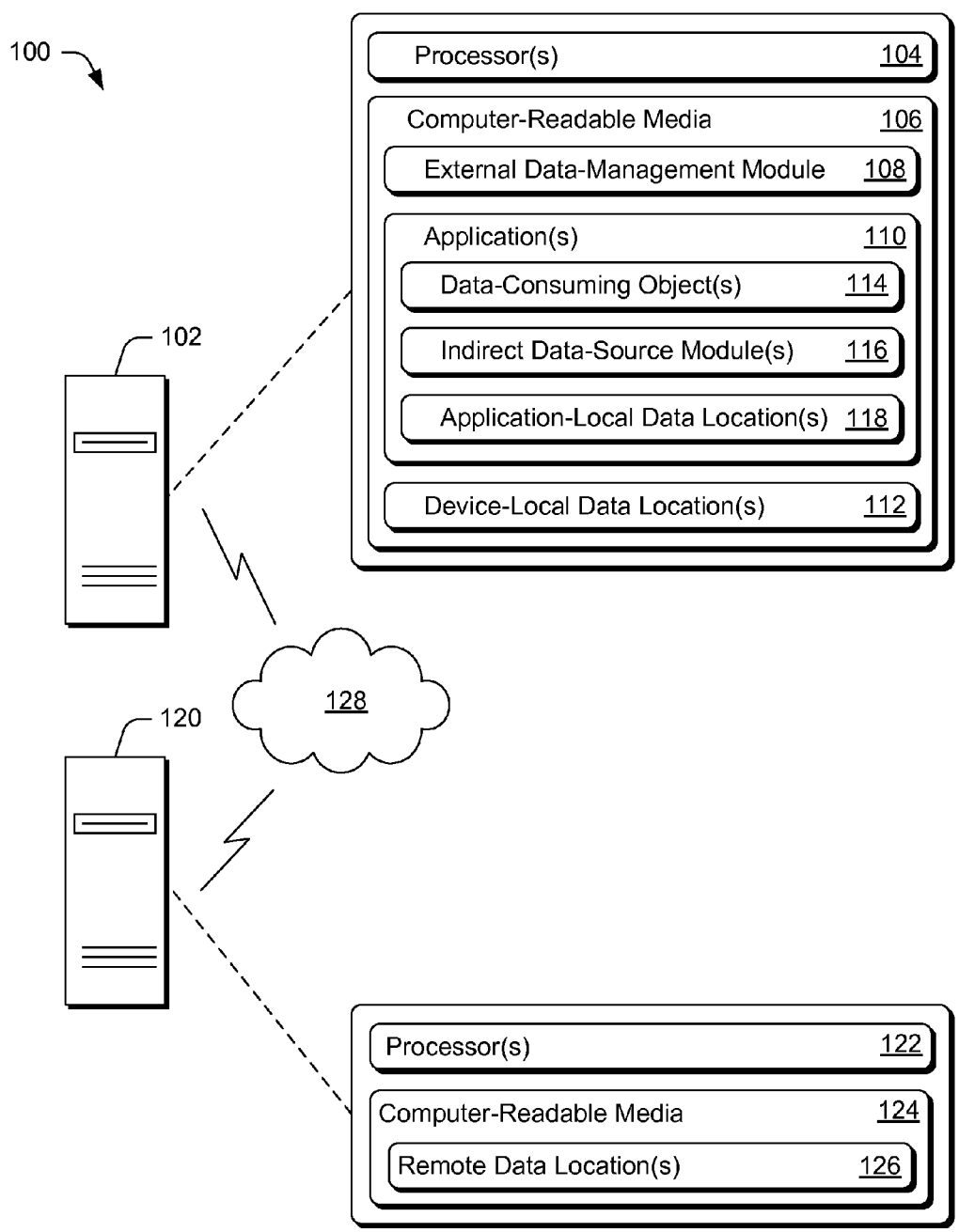
FIG. 1 is an illustration of an environment in which data binding may be used in an application without the need for custom code.

FIG. 1 is an illustration of an example environment 100 in which the tools may enable an application to bind to data without the need for custom code within the application. Environment 100 includes a first computing device 102. Examples of computing device 102 include a set-top box, a personal computer, a media player, and a smart phone to name a few. Computing device 102 includes one or more processors 104 and computer-readable media 106. Computer-readable media 106 contains or has access to an external data-management module 108, one or more applications 110, and one or more optional device-local data locations 112.

External data-management module 108 is external to applications 110 and configured to manage data located at data locations, such as data location 112. In this environment, device-local data locations 112 are local to computing device 102 but not located within applications 110. External data-management module 108 enables developers of applications 110 to manage data from a variety of data locations. External data-management module 108 may filter the data from data locations 112, such as based on a current state of computing device 102, user preferences, or other information. In another embodiment, external data-management module 108 is located on a different computing device and has remote access to information on computing device 102.

Each of applications 110 can be of varying different types, such as a web application, a web service, a word processor, or an executable. Applications 110 may contain one or more data-consuming objects 114, indirect data-source modules 116, and/or application-local data locations 118. Each or either of these data locations 112 and 118 contains data that one or more data-consuming objects 114 may consume. A device-local data location (e.g., 112) may be located on a permanent or removable computer-readable storage medium, such as a DVD, compact disk, USB flash drive, or USB hard drive.

Data-consuming objects 114 are objects that use and/or display data. Some examples include an audio/video recording object, an audio/video/image displaying object, a text box, a button, or a combo box. Each of data-consuming objects 114 is configured to reference data indirectly through indirect data-source modules 116. Indirect data-source modules 116 are configured to communicate with external data-management module 108. Indirect data-source modules 116 inform external data-management module 108 of a data location that external data-management module 108 will manage. Indirect data-source modules 116 may receive data updates from external data-management module 108. Indirect data-source modules 116 may also communicate data updates to those data-consuming objects 114 that want to consume the data.

Data-consuming objects 114 may also or instead reference data directly through external data-management module 108. In this case each of data-consuming objects 114 has code embedded to carry out the duties of indirect data-source module 116. Application-local data locations 118 are data locations within the application that may be directly or indirectly bound to. An example of data at such a location is an application's version information, to which a data-consuming object 114 may bind in order to display such information to the user.

Computing device 102 is optionally configured to communicate with one or more remote computing devices 120, such as a server computer, a personal computer, a media player, or an external storage device. Remote computing device 120 includes one or more processors 122 and computer-readable media 124. Computer-readable media 124 contains or has access to one or more remote data locations 126. Remote data locations 126 contain data that one or more data-consuming objects 114 may consume. Computing device 102 may communicate through a communication network 128 with computing device 120. Communication network 128 may be any network enabling communication between any two or more of the computing devices, such as the Internet, a local-area network, a wide-area network, a wireless network, a USB hub, or a combination of these.

A few examples of data locations 112, 118, and 126 include a computer file/folder, a database, a data variable, a web page, or a web service. Data contained at such data locations 112, 118, or 126 may be of any type, such as one or more family photos, recorded movies, television shows, songs, streaming movies, television show times, media channel lists, pictures, prices and descriptions of goods for sale, application data fields, hyperlinks, or text characters to be displayed. These are not meant to be exhaustive lists of examples. The tools are intended to be used with any sort of data to which any sort of data-consuming object 114 may be bound.

Generally, any of the functions described herein can be implemented using software, firmware, hardware (e.g., fixed-logic circuitry), manual processing, or a combination of these implementations. The terms "tool" and "module," as used herein generally represent software, firmware, hardware, whole devices or networks, or a combination thereof. In the case of a software implementation, for instance, a module may represent program code that performs specified tasks when executed on a processor (e.g., CPU or CPUs). The program code can be stored in one or more computer-readable memory devices, such as computer-readable media 106 and/or 124. The features and techniques of the tools are platform-independent, meaning that they may be implemented on a variety of commercial computing platforms having a variety of processors.

Example Process for Indirectly Binding Data Through an External Entity

The following discussion describes ways in which the tools may operate to enable an application to bind to data without its developer needing to write data-binding code. Aspects of this and other processes described herein may be implemented in hardware, firmware, software, or a combination thereof. These processes are shown as sets of blocks that specify operations performed by the tools, such as through one or more modules or devices and are not necessarily limited to the order shown for performing the operations by the respective blocks. In portions of the following discussion reference may be made to environment 100 of FIG. 1 as well as to FIGS. 3, 4, and 6.

Figure 2:
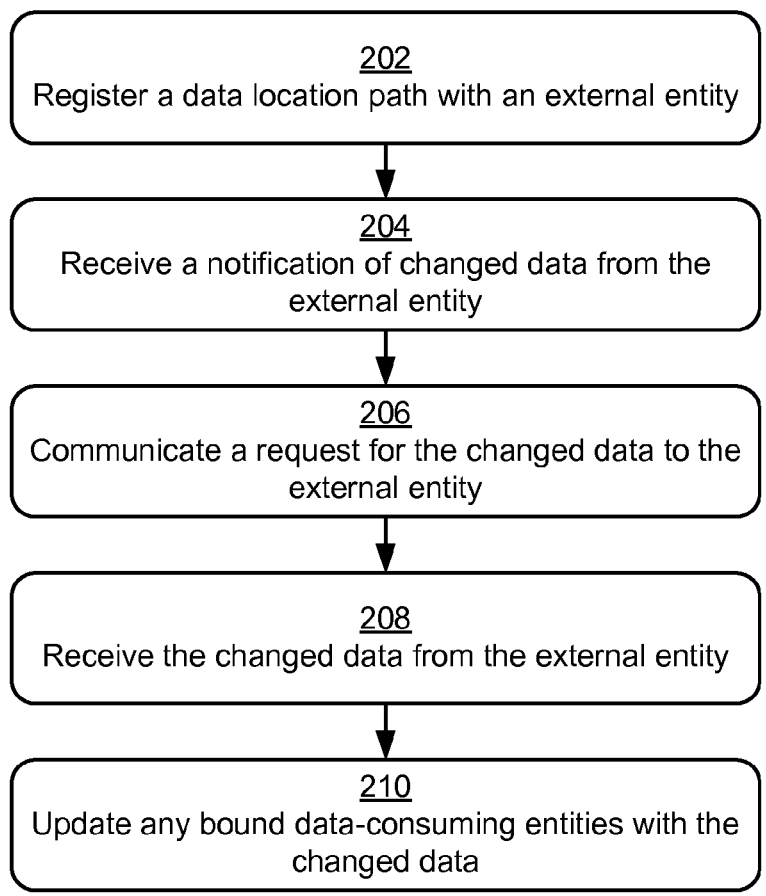
FIG. 2 is a flow diagram depicting an example process for indirectly binding data through an external entity.

FIG. 2 is a flow diagram depicting an example process 200 for binding to data by registering with an external entity that handles the data-binding functionality. An example user interface and system layout is described as part of this example process, though other user interfaces and system layouts are also contemplated.

Block 202 registers a data-location path with an external entity. The data-location path is first defined by the developer within the application. The data-location path is a path to a data location that contains data to which one or more data-consuming entities in the application may wish to bind. Registering the data-location path with the external entity may involve communicating the data-location path to the external entity. The external entity may then monitor the data location specified by the data-location path. In another embodiment, both the external entity and the application are provided with a pre-defined data-location path and block 202 may be skipped.

Figure 3:
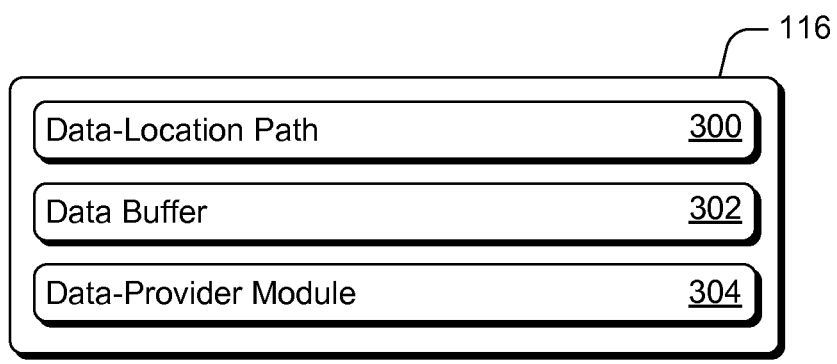
FIG. 3 is a more-detailed illustration of an example of indirect data-source module 116 of FIG. 1.
Figure 4:
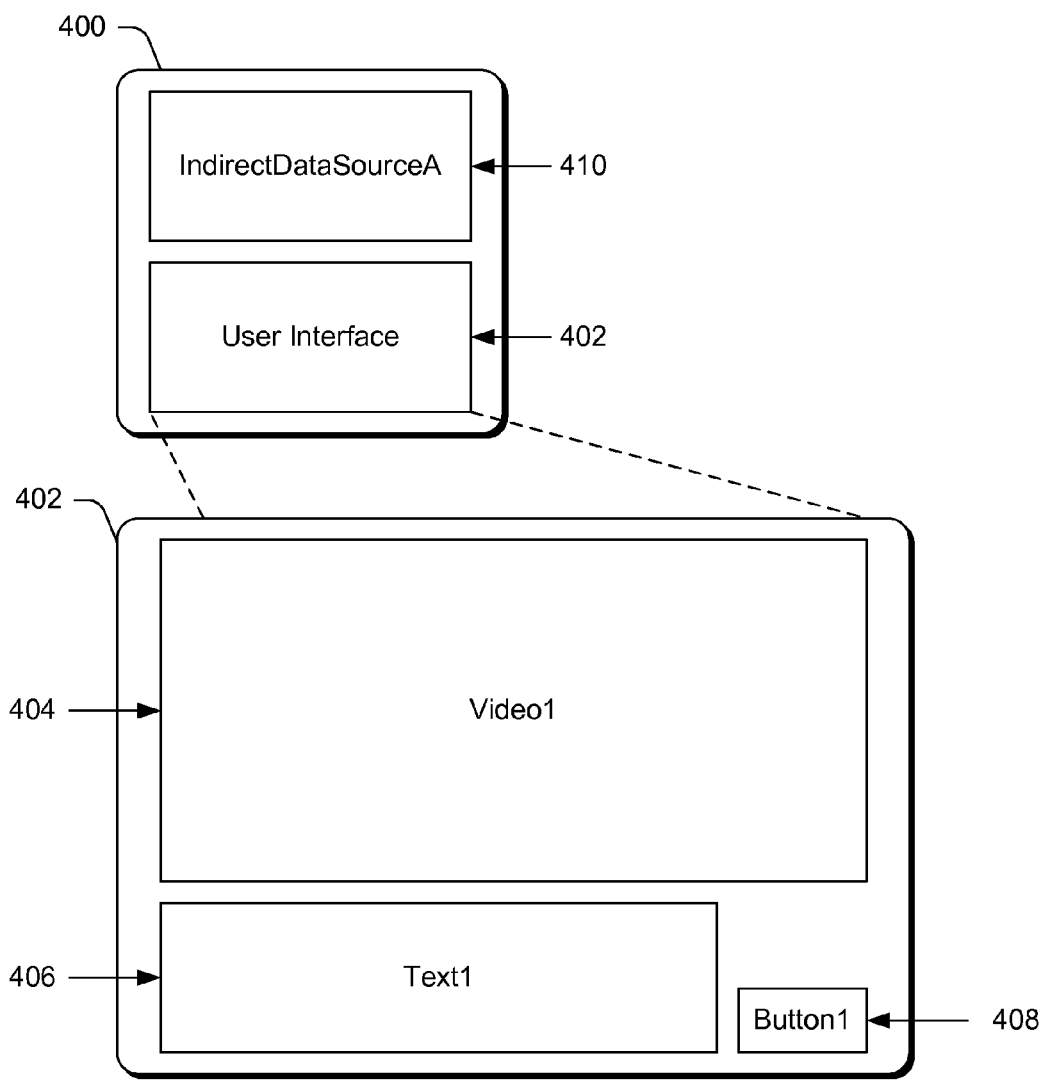
FIG. 4 is an illustration of an example web application and user interface.

By way of example, consider FIGS. 3 and 4. FIG. 3 illustrates a detailed example of indirect data-source module 116 of FIG. 1. Indirect data-source module 116 includes data-location path 300, data buffer 302, and data-provider module 304. The information stored in data-location path 300 is assigned (e.g., by a developer) to an application, such as the web application depicted in FIG. 4 at 400. The labels of FIG. 4 correlate to the proper names used in the example markup shown in Table I below.

TABLE I

| | |
|---|---|
| 1 | <Page> |
| 2 | <Video1 DataSource="{Binding Source=IndirectDataSourceA, path=myTuneUrl[1]}" /> |
| 3 | <Text1 DataSource="{Binding Source=IndirectDataSourceA, Path=myValues[1]}" /> |
| 4 | <Button1 DataSource="{Binding Source=IndirectDataSourceA, Path=myButtonHRef[1]}" /> |
| 5 | <DataSource id="IndirectDataSourceA" Url="http://www.contoso.com/webservice.aspx" /> |
| 6 | </Page> |

Web application 400 includes a user interface 402. User interface 402 includes a video-playing object 404 named Video1, a text-box object 406 named Text1, and a button object 408 named Button1. These objects are all examples of data-consuming objects 114 of FIG. 1 and the data-consuming entities of this method. Web application 400 also includes an example of indirect data-source module 116, here named IndirectDataSourceA 410. IndirectDataSourceA 410, while not displayed to the user of the application, performs a role in the example embodiment. As shown in lines 2-4 of the example markup in Table I, each object references IndirectDataSourceA 410 as its data-binding source. On the fifth line of the example markup, IndirectDataSourceA 410 is assigned a Uniform Resource Locator (URL) to a web service. The URL is provided as an example, though a Uniform Resource Identifier (URI), which may include a URL or a Uniform Resource Name (URN), as well as arbitrary user-defined names may be used. This example URL is stored as data-location path 300 of FIG. 3 and is an example of a data-location path registered in block 202 of FIG. 2. The path values in lines 2-4 of the example markup (Table I) reference specific data values at a data location specified by data-location path 300.

Block 204 receives a notification of changed data from an external entity. This notification may be responsive to the data being checked by the external entity for the first time or because the data has changed since last checked. Block 206 communicates a request for the changed data to the external entity. Block 208 receives the changed data from the external entity. Block 210 updates any bound data-consuming entities with the changed data. In some embodiments, the external entity is configured to automatically communicate the changed data. In such an embodiment, blocks 204 and/or 206 may be skipped.

Continuing the ongoing example, indirect data-source module 116 receives a notification from the external entity as in block 204. The notification informs indirect data-source module 116 that data at the data location specified by data-location path 300 has changed. Indirect data-source module 116 then communicates a request for the changed data to the external entity as in block 206. Upon receiving the changed data (block 208), indirect data-source module 116 stores the changed data in data buffer 302. Indirect data-source module 116 then updates Video1 404, Text1 406, and Button1 408 with the changed data as in block 210 of FIG. 2. This updating is performed by data-provider module 304, which informs the objects of the changed data. The objects then retrieve the changed data from data buffer 302.

For example, the data updated can be a URL of video content for Video1 404 to play. Video1 404 retrieves this data from data buffer 302 via path mytuneUrl[1] of Table I. The data updated can be a text description of the video content for Text1 406 to display. Text1 406 retrieves this data from data buffer 302 via path myValues[1] of Table I. The data updated can be a link to a button to display as Button1 408. Button1 408 retrieves this data from data buffer 302 via path myButtonHRef[1] of Table I. Alternatively, in some embodiments data-provider module 304 actively updates a data field within the objects with the changed data. In those embodiments the paths described above are a data variable within each object but accessible by data-provider module 304. Data-provider module 304 actively sets those variables to the new data value in those embodiments.

Example Device

Applications, such as application 400, may be used in various devices. Consider, by way of example, a set-top box connected to a television. Application 400 may run on such a set-top box and with it a user can preview channels to find something to watch. A user can preview a video in Video1 404 and read the description of what is playing in Text1 406 to decide if he wants to watch it. When a desired channel is found the user may press Button1 408. In the background, the external entity downloads a list of channels from "webservice.aspx" (Table I, line 5). It then changes the data periodically (e.g., to proceed to the next channel preview). Indirect data-source module 116 is informed of the changed data and communicates a request for the changed data. Responsive to receiving the changed data, indirect data-source module 116 updates Video1 404 and Text1 406 objects. These objects then show the updated channel-preview information. Application 400 may forgo code capable of knowing that this is occurring. Application 400 may simply display whatever data the external entity tells it to display. Once Button1 408 is selected, the external entity stops changing the data and application 400 remains on the chosen channel.

Example Process for Providing Indirect Data Binding for an Application

Figure 5:
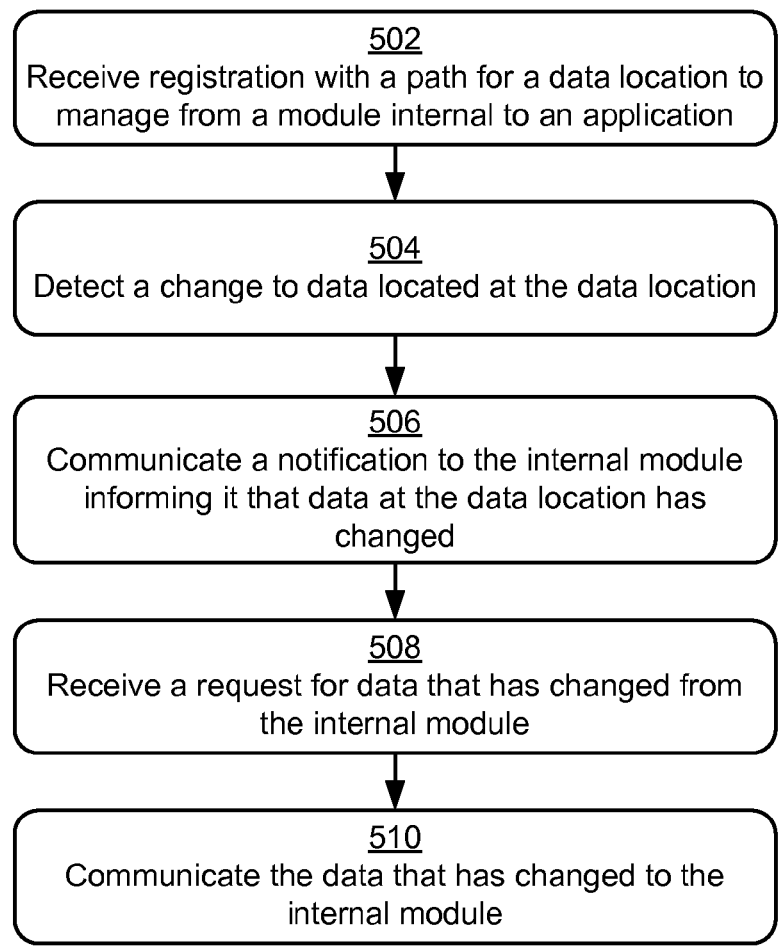
FIG. 5 is a flow diagram depicting an example process in which the tools provide indirect data binding for an application.

FIG. 5 depicts a process 500 in which the tools provide indirect data binding for an application. An example user interface and system layout is described as part of this example process, though other user interfaces and system layouts are also contemplated.

Block 502 receives a registration containing a data-location path, such as data-location path 300 of FIG. 3. The registration can be received from a module located within an application running on the same computing device as this process. The data-location path specifies a data location at which data is located. The internal module registers the data-location path on behalf of one or more data-consuming entities that wish to bind to the data.

Figure 6:
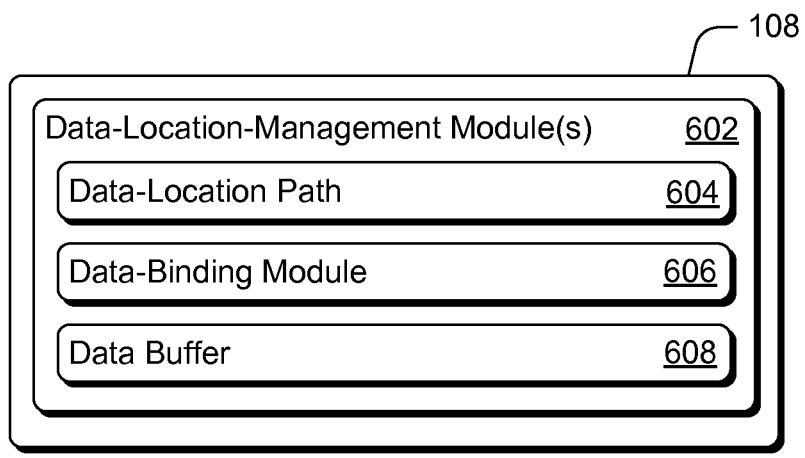
FIG. 6 is a more-detailed illustration of an example of external data-management module 108 of FIG. 1.

By way of example, consider FIG. 6. FIG. 6 illustrates a detailed view of an example of external data-management module 108 of FIG. 1. For purposes of this example, external data-management module 108 performs this process. External data-management module 108 includes one or more data-location-management modules 602. Each data-location-management module 602 manages one data location and includes data-location path 604, data-binding module 606, and data buffer 608. In block 502 data-location path 604 is populated with the data-location path contained within the registration.

Block 504 detects a change to data at the data location. Continuing the ongoing example, data-binding module 606 connects with and understands data at the data location. Data-binding module 606 monitors the data for changes. It detects changes and downloads relevant data into data buffer 608. Block 506 communicates a notification to the internal module informing it that data at the data location has changed. Continuing the example, if the data has any changes, or if this is the first time checking the data, data-binding module 606 informs internal data-source module 116 of the changed state. Block 508 receives a request for the data that has changed. Continuing the example, data-binding module 606 receives a request for the data from indirect data-source module 116. Block 510 communicates (e.g., sends) the data that has changed to the internal module. In another embodiment the changed data is automatically sent to the internal module. In this other embodiment blocks 506 and/or 508 may be skipped. Continuing the example, data-binding module 606 communicates the changed data to indirect data-source module 116.

In the specific example of a set-top box above, data-binding module 606 can be configured to be aware of a user's selection to preview channels based on information located in the set-top box. From the data location, data-binding module 606 may fetch a list of channels, the descriptions for what are currently on each of those channels, and a view-channel button. Data-binding module 606 stores this information in data buffer 608. Data-binding module 606 then selects the first channel, its text description, and the button link. Data-binding module 606 communicates the data to indirect data-source module 116 for the application to display as described previously. After some time has passed, data-binding module 606 sets the channel and text to the next value and again communicates the changed data to indirect data-source module 116 for the application to display. This continues until the user presses the button, which in this specific example is set to perform a view-button function. The user selects the view button to inform the set-top box that this is the channel he wishes to view.

CONCLUSION

This document describes tools capable of updating data-consuming entities. These tools allow a developer of an application to use data binding to update data-consuming entities without the need to write custom code. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
deploying an application and an external entity on a computing device, the application comprising one or more data-consuming entities and an indirect data-source module;
declaring a data-location path to a data location on a web service that contains data the one or more data-consuming entities may consume and recording the data-location path in the indirect data-source module;
binding the one or more data-consuming entities to the indirect data-source module using a markup language;
registering the data-location path with the external entity, the external entity being external to the application, located on the same computing device on which the application is deployed, and capable of managing data from one or more data locations on the web service;
monitoring, by the external entity, the data at the data location specified by the data-location path and the data consumed by the one or more data-consuming entities;
notifying the application, by the external entity, that the data at the data location specified by the data-location path has changed relative to the data consumed by the one or more data-consuming entities; and
updating the one or more data-consuming entities with the data from the data location.

2. The method as recited in claim 1, wherein the data-location path is an internal property of the indirect data-source module.

3. The method as recited in claim 1, further comprising communicating a request from the application to the external entity for the data that was changed.

4. The method as recited in claim 1, further comprising receiving the data that was changed from the external entity.

5. The method as recited in claim 1, wherein the data-location path is a Uniform Resource Identifier.

6. The method as recited in claim 1, wherein the notification by the external entity indicates that the data location has changed, and wherein the method further comprises updating the data-location path recorded in the indirect data-source module and registered with the external entity when updating the one or more data-consuming entities with the data that was changed.

7. The method as recited in claim 1, wherein the data-consuming entity is a video display object and the data is video content.

8. The method as recited in claim 1, further comprising communicating a request from the indirect data-source module to the external entity for the data that was changed.

9. The method as recited in claim 1, wherein the data location is remote from the computing device.

10. The method as recited in claim 1, wherein updating the one or more data-consuming entities further comprises updating the data-location path recorded in the indirect data-source module and registering the updated data-location path with the external entity.

11. The method as recited in claim 1, wherein the data-location path is pre-defined by a developer of the application.

12. The method as recited in claim 1, the indirect data-source module further comprising a data buffer, the data buffer configured to receive the changed data.

13. The method as recited in claim 1, the indirect data-source module further comprising a data-provider module, the data-provider module configured to inform the data-consuming entities of the changed data and to update the data-consuming entities.

14. A system comprising:
one or more processors; and
one or more tangible computer-readable media having stored thereon computer-executable instructions that are executable by the one or more processors to perform operations including:
deploying an application and an external entity on a computing device, the application comprising one or more data-consuming entities and an indirect data-source module;
declaring a data-location path to a data location on a web service that contains data the one or more data-consuming entities may consume and recording the data-location path in the indirect data-source module;
binding the one or more data-consuming entities to the indirect data-source module using a markup language;
registering the data-location path with the external entity, the external entity being external to the application, located on the same computing device on which the application is deployed, and capable of managing data from one or more data locations on the web service;
monitoring, by the external entity, the data at the data location specified by the data-location path and the data consumed by the one or more data-consuming entities;
notifying the application, by the external entity, that the data at the data location specified by the data-location path has changed relative to the data consumed by the one or more data-consuming entities; and
updating the one or more data-consuming entities with the data from the data location.

15. The system as recited in claim 14, wherein the application is a web application, the one or more data-consuming entities are audio or visual display objects, and the changed data is audio or video content.

16. The system as recited in claim 14, wherein the data-location path is a URL.

17. The system as recited in claim 14, wherein the data-location path is pre-defined by a developer of the application.

18. The system as recited in claim 14, the operations further comprising receiving, by the indirect data-source module, the data that has changed into a data buffer.

19. The system as recited in claim 14, the indirect data-source module further comprising a data-provider module, the data-provider module configured to inform the data-consuming entities of the changed data and update the data-consuming entities.

* * * * *